US009319671B2

(12) United States Patent
Han (10) Patent No.: US 9,319,671 B2
(45) Date of Patent: Apr. 19, 2016

(54) SYSTEM AND APPARATUS FOR OBJECTIVE EVALUATION OF IMAGE QUALITY OF DIGITAL IMAGE MEDIA

(75) Inventor: Chan Ho Han, Seongnam-si (KR)

(73) Assignee: KANGWON NATIONAL UNIVERSITY UNIVERSITY-INDUSTRY COOPERATION FOUNDATION (KR)

( * ) Notice: Subject to any disclaimer, the term of this patent is extended or adjusted under 35 U.S.C. 154(b) by 10 days.

(21) Appl. No.: 14/380,961

(22) PCT Filed: Feb. 28, 2012

(86) PCT No.: PCT/KR2012/001476
§ 371 (c)(1),
(2), (4) Date: Aug. 26, 2014

(87) PCT Pub. No.: WO2013/129711
PCT Pub. Date: Sep. 6, 2013

(65) Prior Publication Data
US 2015/0304654 A1    Oct. 22, 2015

(30) Foreign Application Priority Data
Feb. 27, 2012 (KR) .................. 10-2012-0019815

(51) Int. Cl.
*H04N 17/00* (2006.01)
(52) U.S. Cl.
CPC .................. *H04N 17/004* (2013.01)
(58) Field of Classification Search
CPC ..... H04N 17/004; H04N 17/00; H04N 17/02; H04N 17/04; H04N 17/008

USPC .......... 348/181, 180, 189, 191, 192; 702/108, 702/116
IPC .............................................. H04N 17/00,17/02
See application file for complete search history.

(56) References Cited

U.S. PATENT DOCUMENTS 7,586,544 B2 *   9/2009   Han .................. H04N 17/004
                                                                348/191

FOREIGN PATENT DOCUMENTS

| JP | 08317431      | 11/1996 |
| KR | 1019980070567 | 10/1998 |
| KR | 1020050005095 | 1/2005  |

OTHER PUBLICATIONS

International Search Report—PCT/KR2012/001476 dated Feb. 8, 2013.

* cited by examiner

*Primary Examiner* — Sherrie Hsia
(74) *Attorney, Agent, or Firm* — Cantor Colburn LLP (57) ABSTRACT

Provided is a video quality assessment system for digital TV. The video quality assessment system includes a video quality test signal insertion device which inserts a test signal for testing video quality into a predetermined area of a transient effect area (TEA) of each frame of a source video and a video quality measurement device which detects the test signal from a predetermined area of the video signal recovered after reception and outputs the test signal. Preferably, an insertion position of the test signal is one line or two or more lines of the TEA area which are located in a lower end portion of the video, and the test signal is configured with multi-bursts including a large number of frequencies which are in a range of DC to ½ of a sampling frequency.

12 Claims, 9 Drawing Sheets

SYSTEM AND APPARATUS FOR OBJECTIVE EVALUATION OF IMAGE QUALITY OF DIGITAL IMAGE MEDIA

TECHNICAL FIELD

The present invention relates to an objective video quality assessment system for digital video media, and more particularly, a system capable of objectively assessing a video quality of digital video media by inserting a test signal into source video that is the digital video media to transmit the test-signal-inserted digital video media and by receiving and decoding the test-signal-inserted digital video media to detect and analyze the test signal, a video quality test signal insertion device used for the system, and a video quality measurement device.

BACKGROUND ART

In a digital broadcasting system, all the processes are performed on the basis of digital signals, so that video quality becomes clear and audio signals are finely classified into a range of from a low pitch sound to a high pitch sound so as to implement a high audio quality. Therefore, the digital broadcasting system has been rapidly applied and spread through various media such as terrestrial waves, satellites, cable TVs, and the like.

With respect to a test of a DTV receiver for receiving the digital broadcast described above, functions and performance of the receiver are tested by using signals received from the broadcasting system. However, although the test operation is available in the test utilizing an actual broadcasting system, particular signals for performing a test of a particular function of the receiver or uniformly maintaining the performance of the receiver are not provided. Therefore, in general, developers and manufacturers of the DTV receiver configures a virtual broadcasting system in order to perform function test and performance assessment and performs the DTV test utilizing the system.

On the other hand, in an analog TV system, in order to perform the video quality assessment for the video, a test signal (VITS: vertical interval test signal) is inserted into a vertical interval reference (VIR) area of each frame of the source video and is transmitted. The test signal is displayed on a measurement device such as an oscilloscope or a display device such as a monitor at a reception stage, so that the video quality of the video is assessed.

However, as it is difficult to use the above-described method for the digital TV, various approaches of an objective video quality assessment method for the video have been proposed. Particularly, a broadcasting transmission device transmits a source video after an encoding process such as compression is performed on the source video, and a reception device decodes the received video signal and displays the recovered video signal on a screen.

Figure 1:
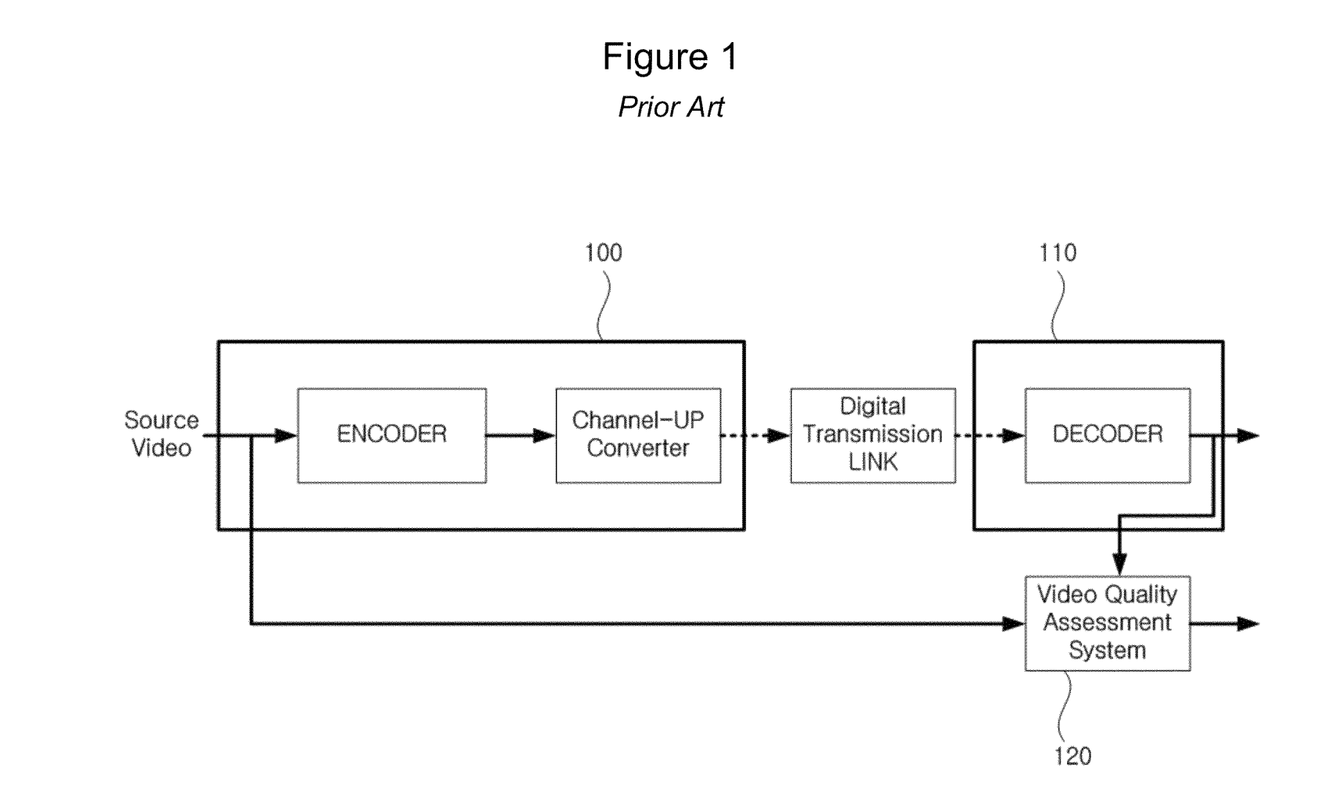
FIG. 1 is a schematic block diagram illustrating a video quality assessment system for a digital video according to a method of the related art.

FIG. 1 is a schematic block diagram illustrating a video quality assessment system for a digital video according to a method of the related art. As illustrated in FIG. 1, a broadcasting transmission device 100 encodes an original source video by using an encoder, and after that, allows a channel-up converter to modulate and up-convert the encoded source video into an RF level and outputs the source video through a digital transmission link 104. A DTV receiver, that is, a broadcasting reception device 110 which receives a video signal as an RF signal in a set top box decodes the received video signal by using a decoder and outputs the decoded video signal to a display device, a video quality measurement device 120, and a measurement device such as an oscilloscope. The video quality measurement device 120 receives a reference signal including characteristic information on a video of which characteristics are extracted from a non-encoded original source video signal or original source video from a broadcasting transmission device by using a different channel and compares the received reference signal to the received, decoded source video to assess video quality, that is, a quality of the video.

In the video quality assessment method of the related art, since data need to be transmitted by using separate channels, there is a problem in that it is difficult to perform video quality assessment in real time at the same time of broadcasting (in an in-service state). In addition, in the video quality assessment method of the related art, the video quality is assessed by comparing an original source video or a reference signal including characteristic information to a decoded source video. However, there are shortcomings in that such a video quality assessment method is very complicated and an expensive video quality assessment system is required.

On the other hand, since visually-determined video quality is subjective in nature and is influenced by many factors, it is not easy to accurately measure the video quality. Therefore, various test methods for the subjective video quality assessment have been proposed. However, because of complicatedness and costs of the subjective video quality measurement method, methods of automatically determining the video quality by using algorithms have drawn much attention. Among the objective video quality assessment methods, the most widely used method is a method using a peak-signal-to-noise ratio (PSNR) which is calculated based on a mean squared error (MSE). The PSNR is measured in a log scale and is determined by a ratio between a square of the maximum number of samples which can exist in an image and a mean squared error (MSE) between an original image and a damaged image. Therefore, a high MSE value denotes a high difference to the original video and is measured as a low PSNR, so that the video quality is determined to be low. However, because of various reasons, in some cases, there is a problem in that assessment using the PSNR does not necessarily relate to actual subjective video quality.

Because of the above-described various problems, it is not easy to objectively assess the video quality of the digital TV.

DISCLOSURE

Technical Problem

The present invention is to provide a video quality measurement device and method for digital TV capable of objectively measuring video quality in real time even in an in-service state.

The present invention is also to provide a video quality measurement device and method for digital TV capable of objectively measuring video quality even though there is no transmission of a source video or characteristic information on the source video.

The present invention is also to provide a video quality measurement device and method for digital TV, which inserts a test signal into a predetermined area of a source video in order to be capable of objectively measuring video quality of all the frames during broadcasting in real time even though there is no transmission of a source video or characteristic information on the source video.

Technical Solution

According to a first aspect of the present invention, there is provided a video quality test signal insertion device including: a test signal generation unit which generates a test signal for testing video quality; and a signal insertion unit which inserts a test signal into a predetermined area of a transient effect area (TEA) of each frame of a source video.

In the video quality test signal insertion device according to the first aspect, preferably, an insertion position of the test signal is one line or two or more lines of the TEA area which are located in a lower end portion of the each frame of the source video.

In the video quality test signal insertion device according to the first aspect, the test signal is configured with multi-bursts including a large number of frequencies which are in a range of DC to ½ of a sampling frequency.

According to a second aspect of the present invention, there is provided a video quality measurement device including: a test signal detection unit which detects a test signal from a predetermined area of a recovered video signal; a signal output unit which outputs the test signal; a time code read-out unit which extracts a time code from the test signal and detects frame identification information from the time code; and a video quality measurement unit which objectively measures video quality by using the test signal and provides the video quality.

In the video quality measurement device according to the second aspect, preferably, the video quality measurement unit measures an amplitude of each burst of the test signal and outputs a numeric value of the video quality in a time domain which is obtained by using the amplitude of each burst, or the video quality measurement unit performs fast Fourier transform (FFT) on the test signal and, after that, measures an amplitude of each burst and outputs a numeric value of the video quality in a frequency domain which is obtained by using the amplitude of each burst.

According to a third aspect of the present invention, there is provided a video quality assessment system for digital TV including: a video quality test signal insertion device which generates a test signal for testing video quality and inserts the test signal into a predetermined area of a transient effect area (TEA) of each frame of a source video; and a video quality measurement device which detects the test signal from a predetermined area of the video signal recovered after reception and outputs the test signal. Preferably, an insertion position of the test signal is one line or two or more lines of the TEA area which are located in a lower end portion of each frame of the source video, and the test signal is configured with multi-bursts including a large number of frequencies which are in a range of DC to ½ of a sampling frequency.

Advantageous Effects

A video quality assessment system according to the present invention inserts a test signal into a TEA area of a source video to transmit the test-signal-inserted source video and detects and analyzes the test signal from a received, decoded video, so that it is possible to assess a video quality without influencing existing broadcast during broadcasting.

In addition, in a video quality assessment system according to the present invention, since a video signal into which a test signal is inserted is transmitted, although a transmission terminal does not transmit a source video or characteristic information on the source video, a reception terminal can assess image quality of the source video.

Figure 9:
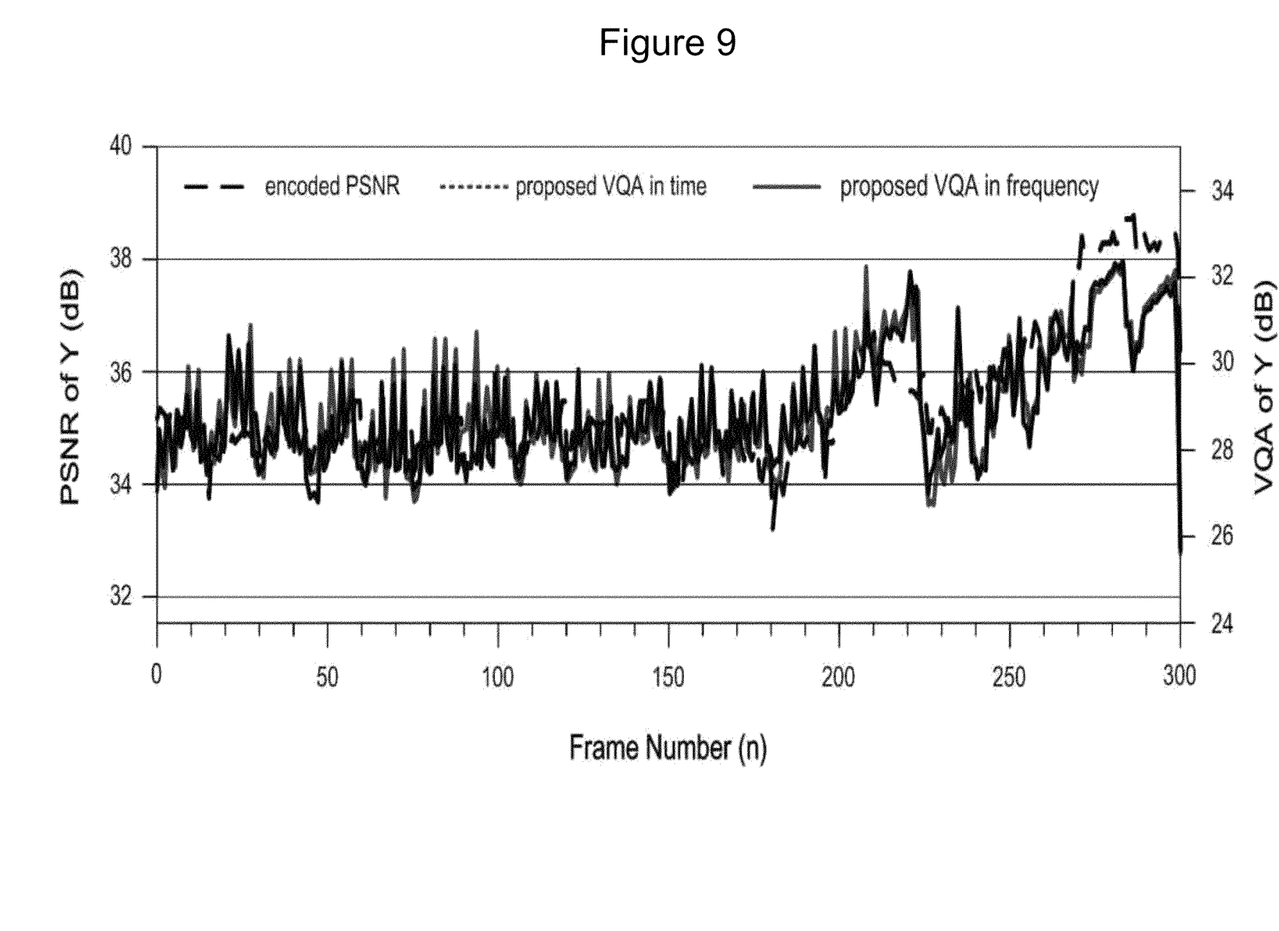
FIG. 9 illustrates graphs of comparison of PSNRs of Y (luminance) signals for frames according to an objective video quality assessment method of the related art and a video quality assessment method of the video quality assessment system according to the present invention.

In addition, the video quality assessment system according to the present invention analyzes the test signal detected from the recovered source video in a time domain and a frequency domain, so that it is possible to provide an objective video quality assessment method. FIG. 9 illustrates graphs of comparison of PSNRs of Y (luminance) signals for frames according to an objective video quality assessment method of the related art and a video quality assessment method of the video quality assessment system according to the present invention. It can be easily understood from FIG. 9 that the result of assessment performed by the video quality assessment method according to the present invention and the result of assessment performed by the video quality assessment method of the related art are objectively equal to each other.

BEST MODES FOR CARRYING OUT THE INVENTION

Hereinafter, a video quality assessment system for digital TV according to an exemplary embodiment of the present invention will be described in detail with reference to the attached drawings.

Figure 2:
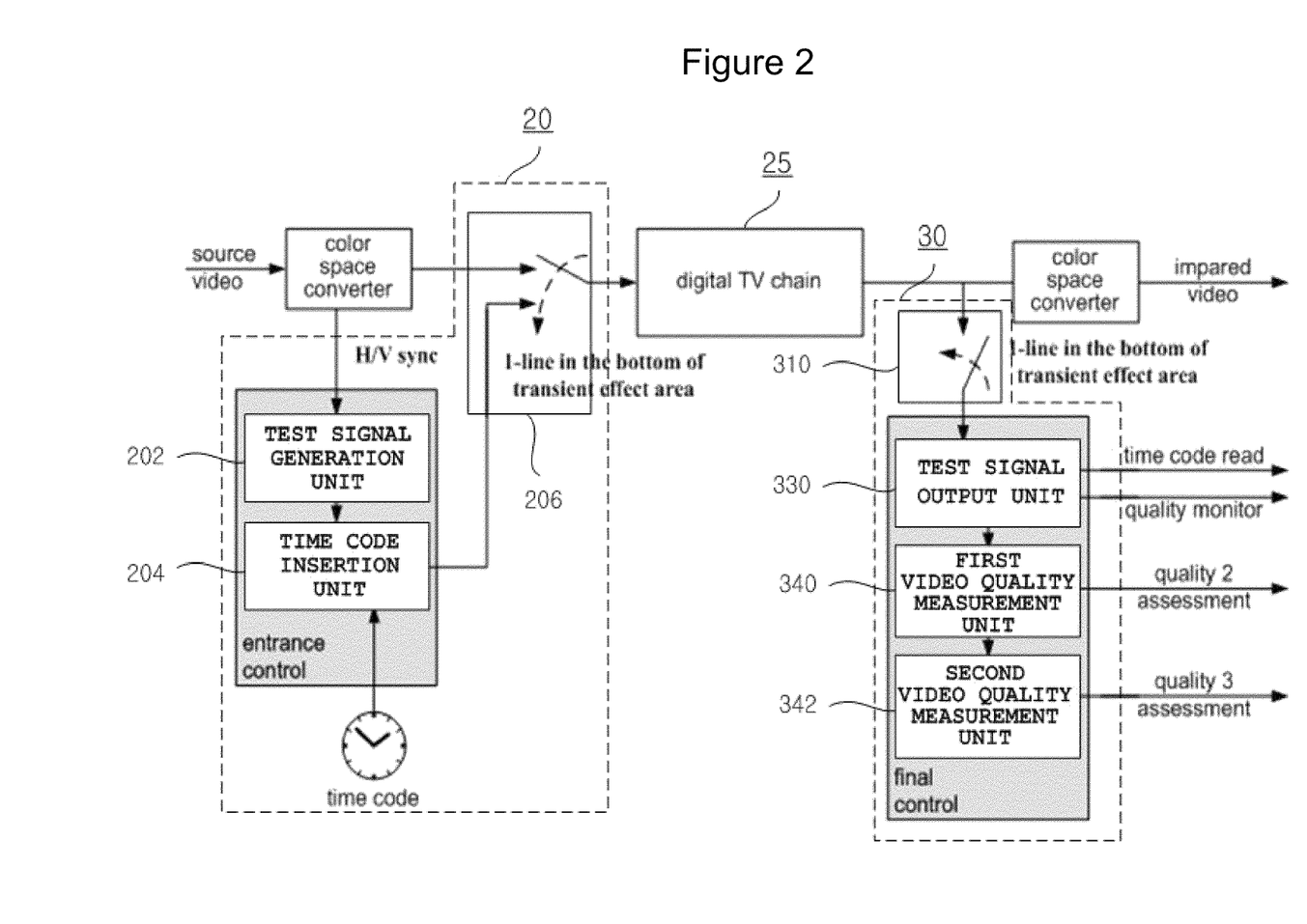
FIG. 2 is a block diagram illustrating an overall configuration of a video quality assessment system for digital TV according t an exemplary embodiment of the present invention.

FIG. 2 is a block diagram illustrating an overall configuration of a video quality assessment system for digital TV according to an exemplary embodiment of the present invention. Referring to FIG. 2, the video quality assessment system for digital TV according to the present invention is configured to include a test signal insertion device 20, a digital transmission link 25, and a video quality measurement device 30.

The test signal insertion device 20 is a device which inserts a test signal for testing video quality into a predetermined area of a transient effect area (TEA) of a source video and is configured to include a test signal generation unit 202, a time code insertion unit 204, and test signal insertion unit 206.

The test signal generation unit 202 generates the test signal for testing the video quality. The time code insertion unit 204 adds a time code including frame identification information and time information to the test signal generated by the test signal generation unit. The test signal insertion unit 206 inserts the test signal into a predetermined area of the TEA of each frame of the source video.

The test signal insertion unit inserts the test signal into one line or two or more lines of the TEA area which are located in the lower end portion of a display area. The test signal is configured with multi-bursts of frequencies which is in a range of DC to ½ of a sampling frequency and is limited by a maximum value of luminance (for example, 235).

Figure 3:
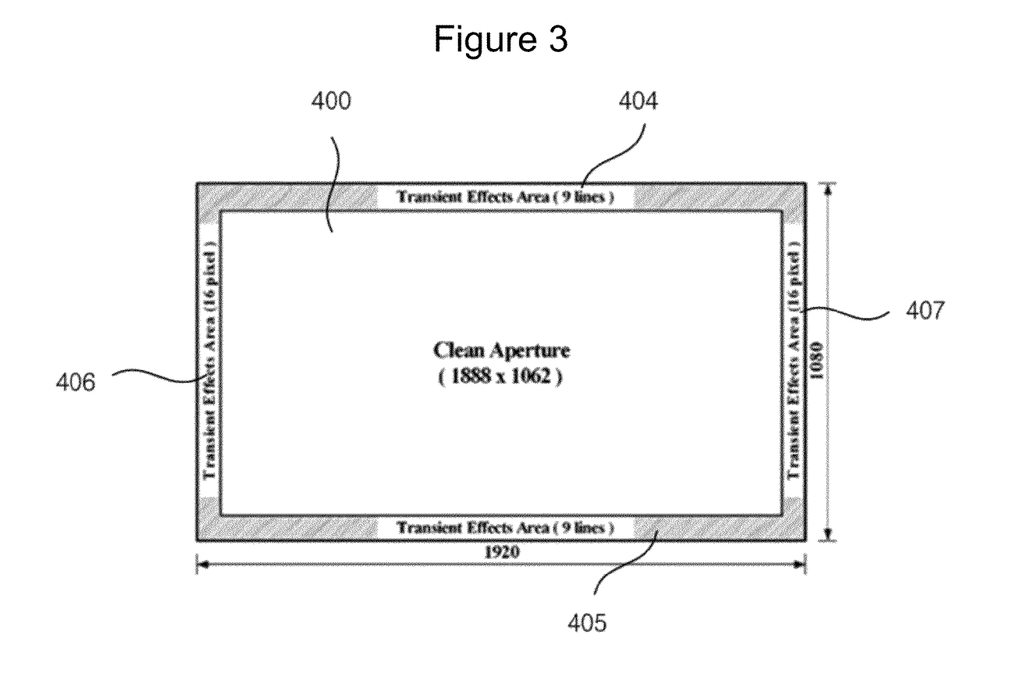
FIG. 3 diagrammatically illustrates a 1920×1080 video format.

FIG. 3 diagrammatically illustrates a 1920×1080 video format. Referring to FIG. 3, a display area (Clean Aperture 400) has a size of 1888×1062. First and second TEA areas 404 and 405, each of which is configured with 9 lines, are located in the respective upper and lower portions of the display area, and third and fourth TEA areas 406 and 407, each of which is configured with 16 pixels, are located at the respective left and right sides of the display area. The TEA areas are area where incomplete videos are output due to operations of a filter for a signal process. The TEA areas are not visible on a normal TV screen. The system according to the present invention is characterized in that a signal for testing video quality of digital TV is inserted into the TEA area of the video and testing of the video quality is performed.

Figure 4:
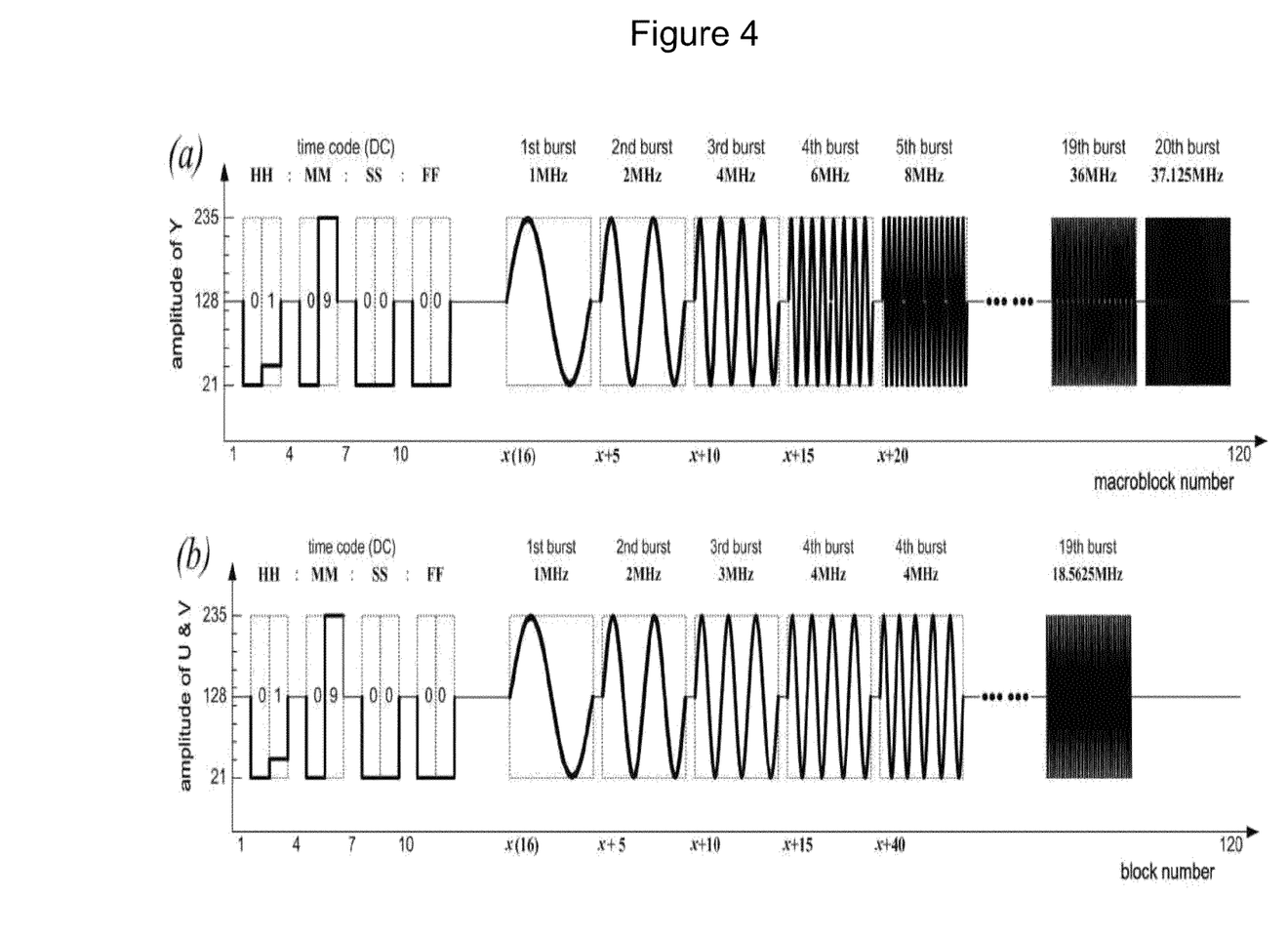
FIG. 4 is a graph illustrating an example of a test signal which is inserted into a TEA area for testing video quality by the system according to the exemplary embodiment of the present invention.

FIG. 4 is a graph illustrating an example of the test signal which is inserted into the TEA area for testing the video quality in the system according to the exemplary embodiment of the present invention. Referring to FIG. 4, the size of the test signal according to the present invention is limited by a maximum luminance value (for example, 235), and the test signal is configured with a time code and multi-bursts. The multi-bursts are configured with a large number of frequencies which are in a frequency range of DC to ½ of a sampling frequency.

The time code is configured in a format of HH:MM:SS:FF to identify a specific frame, and a level (L) is determined by the following Mathematical Formula 1.

$$L = n/9 \times 14 + 21 \quad \text{[Mathematical Formula 1]}$$

Figure 5:
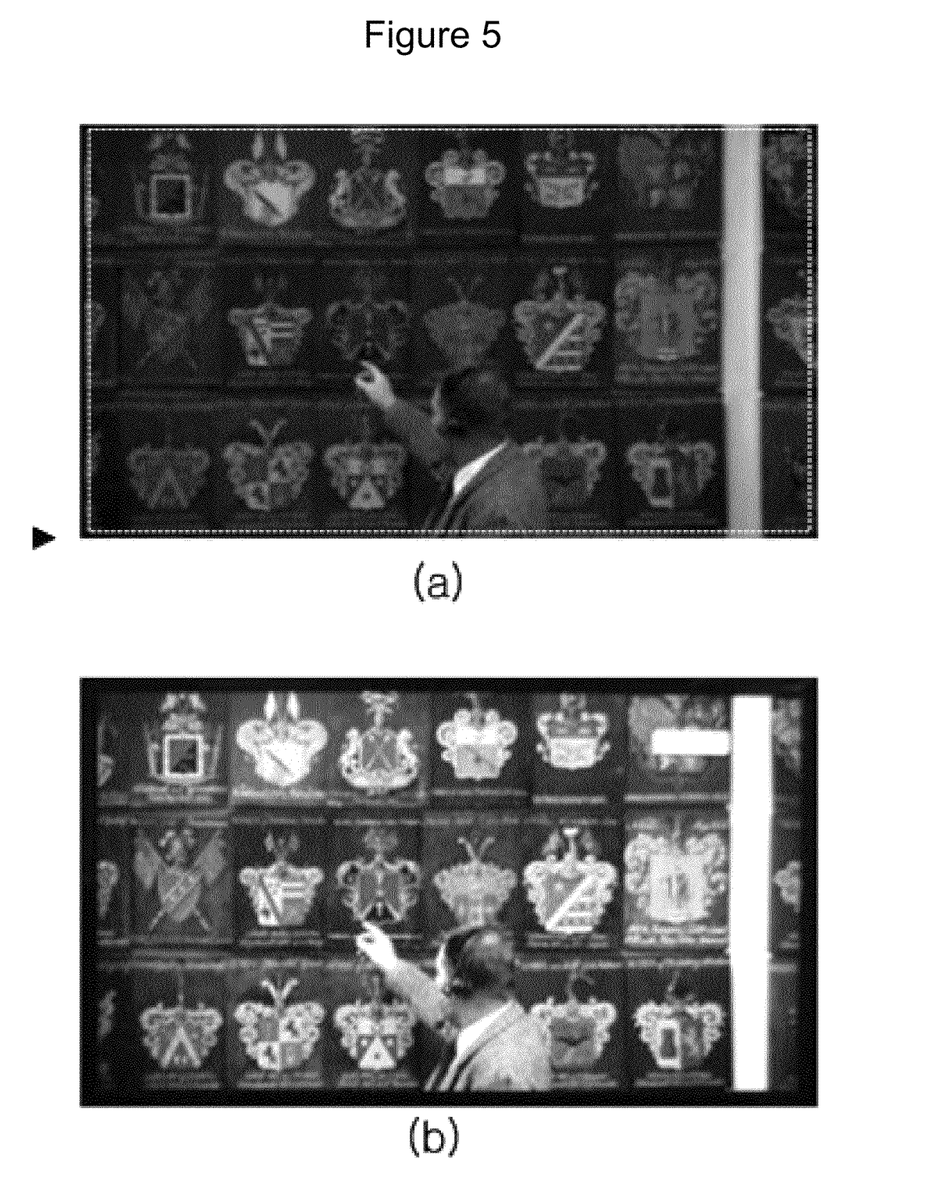
FIG. 5 illustrates (a) a video where a test signal is inserted into a TEA area thereof by the system according to the present invention, and (b) a video which is displayed after reception.

The video quality measurement device 30 according to the present invention detects a test signal from a video signal which is received through a digital transmission link and is decoded, analyzes the test signal to measure the video quality, and outputs the video quality. The video quality measurement device 30 is configured to include a test signal detection unit 310, a time code read-out unit 320, a test signal output unit 330, and first and second video quality measurement units 340 and 342. In FIG. 5, (a) illustrates a video where a test signal is inserted into a TEA area thereof by the system according to the present invention, and (b) illustrates a video which is displayed after reception.

The test signal detection unit 310 detects the test signal from the TEA area of the decoded video signal. The time code read-out unit 320 detects a time code including frame information from the detected test signal and detects frame identification information of the frame.

Figure 6:
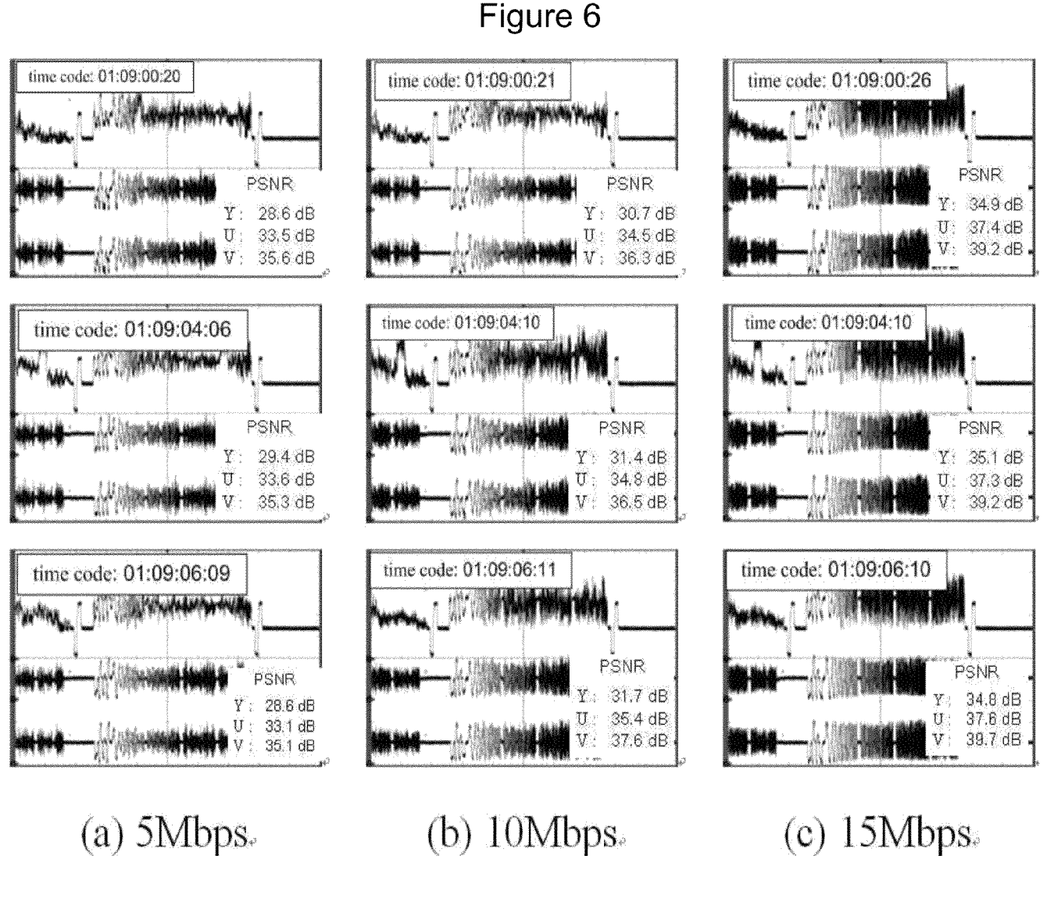
FIG. 6 illustrates graphs of oscilloscope outputs of a test signal output by a test signal output unit of the video quality measurement device according to the exemplary embodiment of the present invention.

The test signal output unit 330 outputs the test signal to an external measurement device such as an oscilloscope. FIG. 6 illustrates graphs of oscilloscope outputs of the test signal output by the test signal output unit of the video quality measurement device according to the exemplary embodiment of the present invention. It can be understood from FIG. 6 that, as a transmission rate is increased, a degree of distortion of each burst is reduced, and the video quality is improved. It can be understood from the result that the video quality assessment method and system according to the present invention can perform the video quality assessment in real time in an in-service state with high performance.

Figure 7:
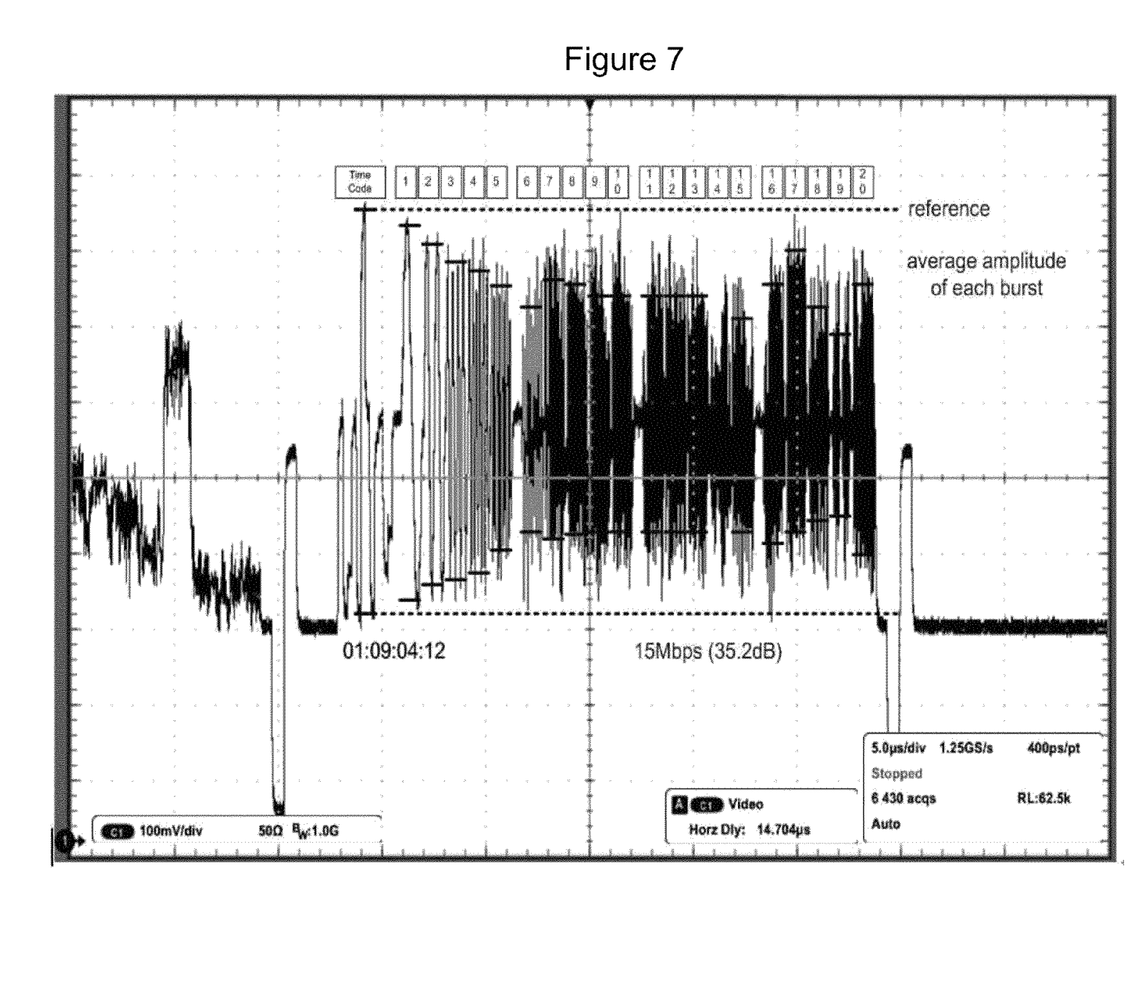
FIG. 7 illustrates a graph of outputs of a test signal received for video quality assessment in a time domain by using a video quality measurement unit of the video quality measurement device according to the exemplary embodiment of the present invention.
Figure 8:
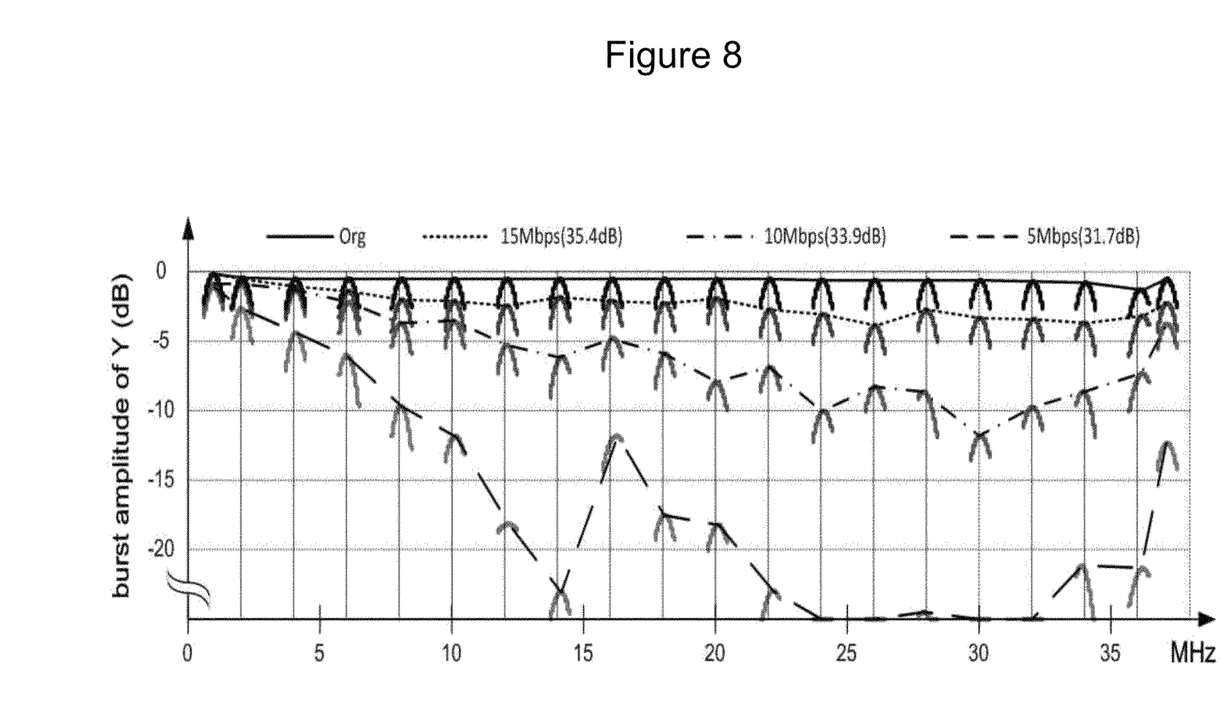
FIG. 8 illustrates a graph of outputs of a test signal received for video quality assessment in a frequency domain by using a video quality measurement unit of the video quality measurement device according to the exemplary embodiment of the present invention.

The first and second video quality measurement units 340 and 342 objectively measure the video quality by using the detected test signal and provide the video quality. The first video quality measurement unit 340 is configured so as to measure the video quality in a time domain. The first video quality measurement unit 340 measures an amplitude of each burst from the test signal and calculates an average value of the amplitudes of the bursts and outputs a numeric value of the video quality which is obtained by using the average value. FIG. 7 illustrates a graph of outputs of a test signal received for video quality assessment in a time domain by using the video quality measurement unit of the video quality measurement device according to the exemplary embodiment of the present invention. The second video quality measurement unit 342 is configured so as to measure the video quality in a frequency domain. The second video quality measurement unit 342 performs fast Fourier transform (FFT) on the test signal and, after that, measures an average amplitude of the bursts and outputs the result. FIG. 8 illustrates a graph of outputs of a test signal received for video quality assessment in a frequency domain by using the video quality measurement unit of the video quality measurement device according to the exemplary embodiment of the present invention.

In this manner, the video quality measurement unit measures a degree of distortion of each burst of the test signal in the time and frequency domains and provides the numerical values thereof. In addition, it is possible to perform video quality assessment for each frame of the source video by using a time code.

INDUSTRIAL APPLICABILITY

A video quality assessment system according to the present invention can be widely used for video applications and service of DVDs or the like as well as video quality assessment for digital TV.

The invention claimed is:

1. A video quality test signal insertion device comprising:
   a test signal generation unit which generates a test signal for testing video quality; and
   a signal insertion unit which inserts the test signal into a predetermined area of a transient effect area (TEA) of each frame of a source video,
   wherein the test signal is configured with multi-bursts including a large number of frequencies which are in a range of DC to ½ of a sampling frequency.

2. The video quality test signal insertion device according to claim 1, further comprising a time code insertion unit which adds a time code including frame identification information to the test signal generated by the test signal generation unit,
   wherein the signal insertion unit inserts the test signal added with the time code.

3. The video quality test signal insertion device according to claim 1, wherein an insertion position of the test signal is one line or two or more lines of the TEA area which are located in a lower end portion of each frame of the source video.

4. The video quality test signal insertion device according to claim 1, wherein a size of the test signal is limited by a maximum luminance value of the source video.

5. A video quality measurement device comprising:
a test signal detection unit which detects a test signal from a predetermined area of a recovered video signal;
a signal output unit which outputs the test signal, and
a video quality measurement unit which objectively measures the video quality by using the test signal and provides the video quality,
wherein the video quality measurement unit is configured to measure an amplitude of each burst from the test signal and output a numeric value of the video quality in a time domain which is obtained by using the amplitude of each burst.

6. The video quality measurement device according to claim 5, further comprising a time code read-out unit, wherein the time code read-out unit extracts a time code from the test signal and detects frame identification information from the time code to output the frame identification information.

7. The video quality measurement device according to claim 5,
wherein the video quality measurement unit is further configured to perform fast Fourier transform (FFT) on the test signal and, after that, measure an amplitude of each burst and output a numeric value of the video quality in a frequency domain which is obtained by using the amplitude of each burst.

8. The video quality measurement device according to claim 5, wherein the video signal includes the test signal for testing video quality in the lower end portion of a TEA area of each frame.

9. A video quality assessment system for digital TV comprising:
a video quality test signal insertion device which generates a test signal for testing video quality and inserts the test signal into a predetermined area of a transient effect area (TEA) of each frame of a source video; and
a video quality measurement device which detects the test signal from a predetermined area of video signal recovered after reception and outputs the test signal,
wherein the test signal is configured with multi-bursts including a large number of frequencies which are in a range of DC to ½ of a sampling frequency.

10. The video quality assessment system according to claim 9, wherein an insertion position of the test signal is one line or two or more lines of the TEA area which are located in a lower end portion of each frame of the source video.

11. The video quality assessment system according to claim 9,
wherein the video quality measurement device further includes a video quality measurement unit which objectively measures the video quality by using the test signal and provides the video quality, and
wherein the video quality measurement unit measures an amplitude of each burst from the test signal and outputs a numeric value of the video quality in a time domain which is obtained by using the amplitude of each burst.

12. The video quality assessment system according to claim 9, wherein the video quality measurement device further includes a video quality measurement unit which objectively measures the video quality by using the test signal and provides the video quality,
wherein the video quality measurement unit performs fast Fourier transform (FFT) on the test signal and, after that, measures an amplitude of each burst from the resulting test signal and outputs a numeric value of the video quality in a frequency domain which is obtained by using the amplitude of each burst.

* * * * *